United States Patent [19]
Tuttle

[11] B 4,014,791
[45] Mar. 29, 1977

[54] OIL SEPARATOR

[76] Inventor: Ralph L. Tuttle, 7135 Hollywood Blvd., Hollywood, Calif. 90028

[22] Filed: Sept. 27, 1973

[21] Appl. No.: 401,221

[44] Published under the second Trial Voluntary Protest Program on April 6, 1976 as document No. B 401,221.

Related U.S. Application Data

[63] Continuation-in-part of Ser. No. 291,725, Sept. 25, 1972, abandoned, which is a continuation-in-part of Ser. No. 221,915, Jan. 31, 1972, abandoned.

[52] U.S. Cl. .............................. 210/114; 210/115; 210/519; 210/540
[51] Int. Cl.$^2$ ........................................ B01D 21/24
[58] Field of Search .......... 210/114, 115, 519, 540; 55/172, 176, 462

[56] References Cited
UNITED STATES PATENTS

| | | | |
|---|---|---|---|
| 45,204 | 11/1864 | Ham | 55/462 |
| 663,099 | 12/1900 | Reynolds | 55/462 |
| 1,530,836 | 3/1925 | Kuzilik | 210/114 |
| 2,055,048 | 9/1936 | Puls | 55/462 X |
| 2,205,336 | 6/1940 | Beach | 210/519 X |
| 2,609,099 | 9/1952 | Griswold | 210/115 |
| 3,672,511 | 6/1972 | Watson et al. | 210/519 |

*Primary Examiner*—John Adee
*Attorney, Agent, or Firm*—Lyon & Lyon

[57] ABSTRACT

A device for separating oil from water comprising a vessel in which the fluid to be separated is injected under pressure at a very high rate and directed against an improved type of deflector arrangement whereby the deflector plate substantially reverses fluid flow, directing it into a collecting collar which again reverses its flow causing interaction of the fluid upon itself to initiate separation of the less dense oil from the water, whereupon the oil is allowed to rise within the vessel and the water is drawn off at the bottom thereof. The fluid inside the vessel is maintained under a positive pressure and the rate of withdrawal of oil and water is separately controlled so as to maintain the pressure and to maintain a constant separation rate at the oil-water interface.

11 Claims, 2 Drawing Figures

OIL SEPARATOR

BACKGROUND OF THE INVENTION

This is a continuation-in-part of my earlier application filed Sept. 25, 1972, Ser. No. 291,725 now abandoned which was a continuation-in-part of my application filed Jan. 31, 1972, Ser. No. 221,915, now abandoned.

There have been many systems proposed to cause the separation of oil from water many of which rely upon permitting the combined solution to merely settle out in a holding vessel of some type. The difficulty, of course, with such systems is the time required to permit settling to occur. Other systems employ filters of various types, but these require constant attention and cleaning and therefore have a considerable unnecessary expense in terms of parts and labor as well as frequent periods of inactivity. In order to speed up the separation process without using a filter a number of other systems have been proposed including gas flotation as disclosed in the U.S. Pat. to R. A. Baum No. 2,746,605, wherein gas is injected under pressure so that the gas goes into solution whereupon it will adhere to the particles causing them to float to the surface of the water more rapidly. Gas flotation systems find particular application in the separation of solid particles from water but in view of the present invention it is felt that gas flotation is not essential to the separation of oil from water and employs extra unnecessary and costly equipment.

SUMMARY OF THE INVENTION

The present invention has as its primary object the provision of a greatly simplified oil separating device which maintains an unusually high degree of separation while being able to handle very high fluid flow rates. Oil separation is achieved in the present invention by injecting the combined fluids into the interior of a closed vessel and directing the flow against a series of baffles which cause the flow to be directed back against itself in such a manner that the initial upward component of flow is substantially nullified whereby separated oil flows rapidly to the top of the vessel and separated water flows rapidly to the bottom. Upward flow is directed first agianst a concave surface which directs the flow back downwardly into a conically shaped collar which again reverses the flow upwardly and outwardly wherein substantial portions of the flow are directed back against themselves which seems to cause rapid separation of the oil particles from the water. Separation is further enchanced by maintaining all of the fluid under positive pressure, and by sensing the location of the oil-water interface, the withdrawal rates of the oil and water are separately controlled so as to maintain a constant pressure even though the relative oil concentration may vary over a considerable range. In an improved embodiment of the invention, an extendible sleeve surrounds the baffle assembly and can deliver the separating fluids at the proper height in the tank, regardless of the size of the tank.

The particular objects hereinabove mentioned and the advantages of the present invention will become more readily apparent upon reading the ensuing detailed description in conjunction with the drawing.

DESCRIPTION OF THE PREFERRED EMBODIMENT

Figure 1:
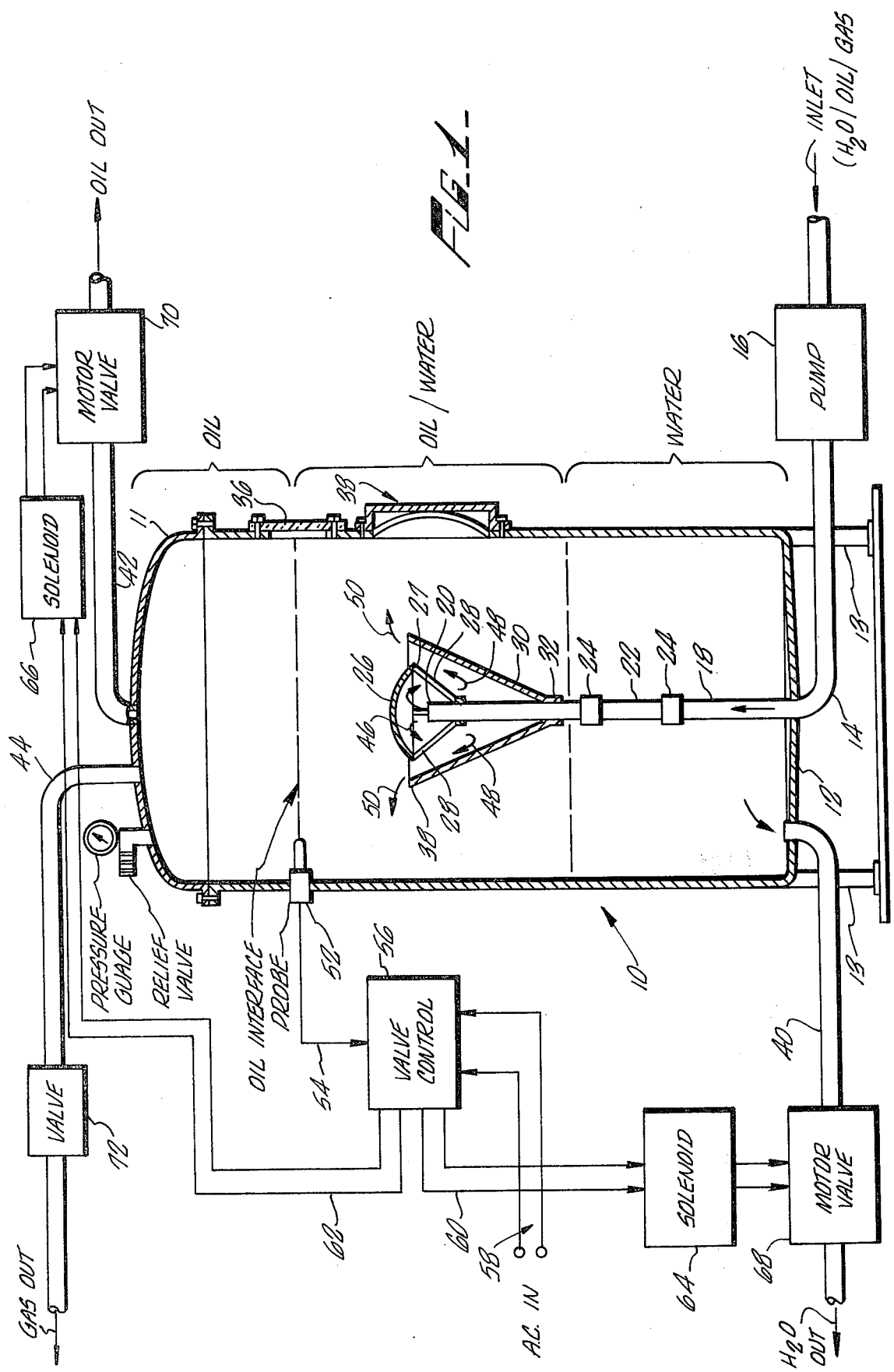
FIG. 1 is a cross-sectional elevation of an oil separating vessel and control system employing the details of the present invention.

The apparatus shown in FIG. 1 consists of a closed vessel 10 which can be cylindrical in configuration having a top 11 and a bottom 12. The vessel is supported by a number of legs 13.

An inlet pipe 14, provided with a pump 16, extends into the bottom 12 of the vessel and includes a vertically extending riser portion 18 having an outlet 20 at the end thereof. The location of the outlet 20 may be varied by providing a nipple 22 including couplings 24 in the riser portion 18 whereby the overall length of the riser can be varied to change the location of the outlet 20 to allow for different specific gravities of the inlet fluids and for different fluid pressures. It has been found, however, that the location of the outlet aperture should be approximately midway within the height of the vessel, although this may vary as will be discussed in connection with FIG. 2.

At the outlet aperture 20 is mounted a concave disc deflector 26 which is secured to the riser 18 by means of a plurality of extension legs 28, numbering three or more. Also surrounding the outlet aperture 20 is conically shaped collecting collar 30 which is secured to the riser at 32. The upper edge 34 of the collecting collar 30 is situated a short distance above the outlet aperture 20 of the riser and slightly above the lower edge 27 of the deflector disc 26.

The side of vessel 10 may also be provided with a sight window 36 from which one may observe the level of the oil interface. A manway 38 is also a desirable feature, providing access to the interior of the vessel for adjustment of the deflector plates, cleaning, etc.

An outlet conduit 40 for separated water is coupled to the bottom of the vessel. An outlet conduit 42 for oil is coupled to the top 11, as in another conduit 44 for gas. Fluid consisting of water and oil as well as some solids such as may be present at a wellhead is introduced to the vessel through inlet conduit 14 as substantial flow rates as high as several hundred gallons per minute depending on the size of the vessel. When the fluid exits from aperture 20 it is directed against the deflector disc 26 whereupon its direction of flow will be reversed by the concave shape of the disc in the manner represented by the arrows 46, whereby flow will be directed downwardly into the collecting collar 30. This direction of the flow is further assured by the displacement of the lower edge of the disc below the top edge of the collar. Upon reaching the interior of the collar, the direction of flow will again be reversed as indicated by arrows 48 and it is in this area that flow coming in the direction of arrows 46 is directed again fluid going in the direction of arrows 48 which initiates the separation action. Fluid rising in the direction of arrows 48 will again pass upwardly but at a substantially reduced rate of flow and will exit from the top of the collecting collar in the manner shown by the arrows 50. In the area immediately above and below the top edge 34 of the collar, rapid separation of the oil from the water occurs, whereupon the oil rises rapidly to the top of the vessel and water will drop to the bottom. It has been found that most suspended solids do not separate from solution but will remain in the oil and are in large part removed from the water, so that the separated water is substantially pollution free. As separation continues and oil buildup in the top of the tank increases, further injection of fluid into the tank forces more oil out of suspension. Where the oil/water concentration of the fluid being treated remains substantially constant, pressure within the vessel can be adequately controlled by hand valves in outlet conduits 40 and 42 so that a given level of oil buildup remains in the top of the vessel. It has been found that for a vessel having a diameter of 48 inches and a height of 69 inches, a substantially complete separation of oil sludge and water was easily obtained at a flow rate of approximately 6000 barrels per day, where the inlet and outlet conduits were four inches in diameter. Increased flow rates can be handled by this apparatus by increasing the capacity of the vessel.

Using a vessel of the aforesaid dimensions, it was connected to the outlet of a typical wellhead in a California oil field, the effluent of which was approximately equal portions of water and crude oil, plus some suspended solids. Tests of the separated water showed that it was free of visible oil residue and that it contained less than twenty parts per million of suspended solids. The separated oil contained only a trace of water but in excess of one thousand parts per million of suspended solids. Thus, the present invention has been shown to provide an effective means of separating water from a mixture of oil and water in such a way that the resultant water is sufficiently free of pollutants that it can be dumped into oceans or streams without harmful results.

As an alternative embodiment of the present invention, it is contemplated that a vessel of somewhat larger dimensions may be constructed without necessity for a top closure element so that oil is merely collected in the upper portion of the vessel and retained there for later removal by other means. Such a device has particular application in handling the pumped effluent from ship bilges or oil tanker ballast tanks where the oil concentration is relatively low, percentage wise, yet still too high to permit disposal. Here, the vessel of the present invention may be partially submerged and taken to the ship by barge. The water outlet conduits are merely opened to the sea, but should extend some distance below the bottom of the vessel to a location of higher fluid pressure for more effective oil separation.

Where the oil/water concentration of the fluid being treated varies substantially, it is necessary to provide variable controls on the outlet conduits so as to maintain a substantially constant head of separated oil in the vessel. This is accomplished by providing an oil-interface probe 52 in the vessel at a preselected level above the deflector plates. Probe 52 provides an electrical output on line 54 to a valve control unit 56 having power input leads 58. Valve control 56 provides output signals on lines 60 and 62 to solenoids 64 and 66 respectively which are, in turn, coupled to motorcontrolled valves 68 and 70 to open or close to vary the rate of flow in the outlet conduits so that the oil interface level will remain substantially constant, thus maintaining a constant pressure in the vessel. In addition, oil well fluids frequently include some gas which will also be at least partially separated during treatment within the vessel. Gas outlet conduit 44 is provided with a relief valve 72 to permit escape of the gas.

Figure 2:
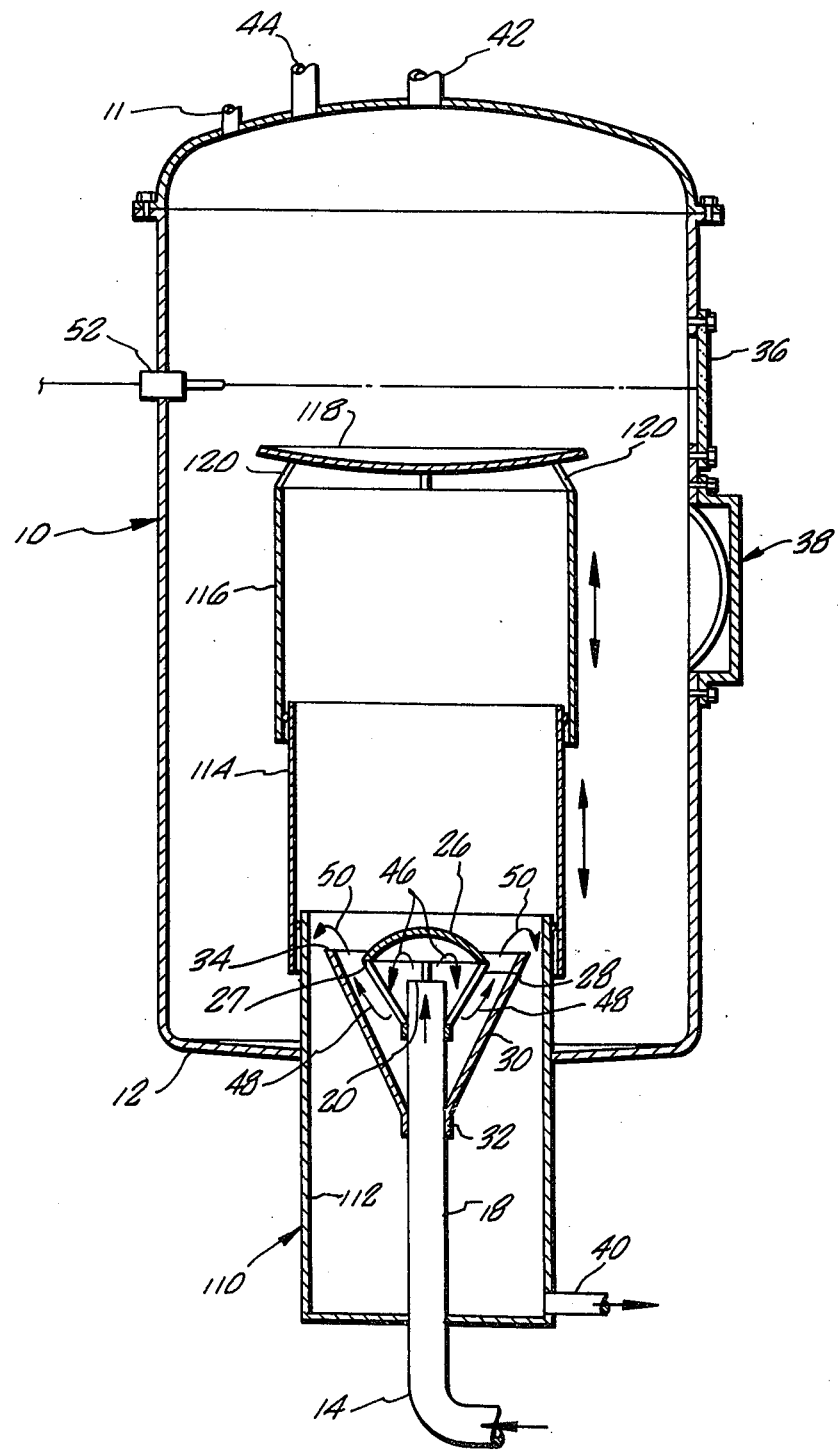
FIG. 2 is a partial sectional elevation of the system employing the extendable sleeve.

I have found by proportioning the size of the collar 30 to the diameter of the vessel so that the edge 34 is quite close to the vertical walls, that better separation and less subsequent mixing occurs. As original equipment, it is simply necessary to make or use a tank having a diameter of a few feet and deflector plates of proportionate size. But for large capacity tanks, and particularly for the adaptation of existing vessels, the structure shown in FIG. 2 may be used. Here, the bottom of vessel 10 is opened up and a cylindrical chamber 110 installed. Chamber 110 receives the inlet riser 18 and has a lower outlet conduit 40. The deflector plate assembly previously described is affixed to riser 18 as before, but here the edge 34 of collar 30 is located relatively close to sidewall 112 of chamber 110. The location of chamber 110 and the deflector plate assembly located therein can be near the bottom of the vessel 10 but, as previously described herein, it is necessary to inject the separating fluids at a higher level in the tank nearer the center or more towards the top, and such level will vary depending upon how that concentration or mixture varies. In order to introduce the separated fluids at a higher level in the tank, one or more sleeves 114 and 116 are provided in telescoping fashion within the vessel 10 surrounding the sidewalls of chamber 110. Although FIG. 2 shows two telescoping sections in conjunction with chamber 110, it will be apparent that the number of sleeves could be one or more. The upper sleeve 116 is provided with a deflector disc 118 above the opening thereof to laterally deflect the upwardly flowing oil initially separated farther down the sleeve column. The deflector disc 118 is shaped convexly on its lower surface and is spaced above the upper edge of the sleeve 116 by a number of supporting arms 120. Linkage may be affixed to the sleeves 114 and 116 in order to move them upwardly or downwardly from outside the tank and although such mechanisms not shown herein, various types are contemplated. By means of the improvement shown in FIG. 2, it will be apparent that existing tanks, vessels or storage compartments containing fluids to be separated could be adapted by using the principle of the invention by merely installing the chamber 110 and the associated extension sleeves and deflector plate assembly rather than building a complete new separation vessel. It is also contemplated that it may be necessary to provide an additional water drain outlet in the bottom 12 of vessel 10 in FIG. 2 to remove any residual water separated after it reaches deflector disc 118. As before, the interface probe 52 may be utilized to control the operation of the unit.

While several embodiments of the present invention have been shown and described, it will be obvious to those persons skilled in the art that changes and modifications might be made herein without departing from this invention in its broader aspects and it is intended hereby to cover all such changes and modifications as fall within the true scope and spirit of this invention.

I claim:

1. Apparatus for separating oil and water from an oil-water mixture, comprising: a vessel, an inlet conduit extending upwardly into said vessel, said inlet conduit having a discharge port at the terminus thereof, deflector means stationed within said vessel in juxtaposition to said discharge port, said deflector means comprising means for intercepting fluid discharged from said port including first intercepting means stationed opposite said discharge port and second intercepting means stationed opposite said first means whereby fluid directed against said first means is once reversed and directed against said second means whence said fluid is again reversed in direction, a first outlet port near the bottom of said vessel for drawing off separated water from said vessel, a second outlet port near the top of said vessel for drawing off separated oil from said vessel, and control means coupled to said outlet ports for independently controlling the rate of outflow therefrom.

2. The apparatus described in claim 1 wherein said deflector means comprises:
a first disc shaped plate member having a concave surface, said concave surface being positioned in opposed relation to said discharge port,
a collar mounted upon said inlet conduit surrounding said discharge port, said collar having a closed lower end and an open end, said upper end having the edge thereof spaced from and above the outer peripheral edge of said disc member.

3. The apparatus set forth in claim 1 wherein said inlet conduit is provided with length adjusting means for varying the location of said discharge port within said vessel, said deflector means being rigidly attached to said inlet conduit at points near said discharge port and spaced from said discharge port in mutually opposing relationship.

4. The apparatus described in claim 1 further including a top closure element mounted upon said vessel, a second outlet conduit coupled to said second outlet port in said vessel situated near the top thereof for drawing off fluid from the top of said vessel, said first and second outlet conduits having valve means therein for adjusting the rate of fluid flow therethrough.

5. Apparatus for separating two fluids of different specific gravities from a mixture of the two, comprising:
a vessel, an inlet conduit extending upwardly in said vessel from a point near the bottom thereof, said conduit having an end positioned approximately at the central locus of said vessel, a discharge port at the end of said conduit, said discharge port being directed generally upwardly in said vessel;
deflector means mounted upon said inlet conduit at points near the end thereof, said deflector means comprising a conically shaped collar member having the small end thereof secured around said conduit providing a closed lower end, said collar extending upwardly and outwardly and having the uppermost edge thereof positioned above said discharge port, a disc shaped member secured to said conduit by a plurality of extension legs, said disc member being positioned directly over and spaced above said discharge port, said disc member having a concave lower surface; said disc member having the lowermost edge thereof positioned below the uppermost edge of said collar; and
at least one outlet conduit in said vessel near the bottom for drawing off the denser fluid from said vessel.

6. The apparatus set forth in claim 5 further including a top closure member mounted upon said vessel, a second outlet conduit in said closure member for drawing off the lesser dense fluid from said vessel, said first and second outlet conduits each having valve means therein for independently controlling the rate of fluid flow in each conduit to maintain the rate of fluid separation within the vessel constant.

7. The apparatus set forth in claim 6 further including level sensing means mounted in said vessel for sensing the level of the interface between the separated oil in said vessel and the remainder of the fluid therein, said sensing means being coupled to valve control means, said valve control means being coupled to said valve means.

8. The apparatus set forth in claim 7 further including a third outlet conduit coupled to said vessel near the top thereof, pressure relief means coupled to said third conduit means for permitting the escape of separated gases from said vessel.

9. Apparatus for separating two fluids of different specific gravities from a mixture of the two, comprising:
means forming a cylindrical chamber having an open upper end and a closed bottom end, means for affixing said chamber in the bottom of a storage vessel, an inlet conduit extending upwardly in said chamber from a point near the bottom end, said inlet conduit having a discharge port at the terminus thereof, a cylindrical extension sleeve mounted upon the upper end of said chamber, the upper discharge end of said sleeve having a deflector disc mounted thereover, means for adjustably varying the height of said sleeve to locate the discharge end of said sleeve at a chosen position within a vessel;
deflector means mounted upon said inlet conduit, said deflector means comprising means for intercepting fluid discharged from said port including first intercepting means stationed opposite said discharge port and second intercepting means stationed opposite said first means whereby fluid directed against said first means is once reversed and directed against said second means whence said fluid is again reversed in direction, and an outlet port near the bottom of said chamber for drawing off separated fluid.

10. The apparatus set forth in claim 9 wherein said deflector means comprises:
a first disc shaped plate member having a concave surface, said concave surface being positioned in opposed relation to said discharge port,
a collar mounted upon said inlet conduit surrounding said discharge port, said collar having a closed lower end and an open upper end, said upper end having the edge thereof spaced from and above the outer peripheral edge of said disc member.

11. The apparatus set forth in claim 10 wherein the diameter of said cylindrical chamber and the diameter of the upper end of said collar are chosen such that there exists a narrow annular space therebetween.

* * * * *